(12) United States Patent
Zhuang et al.

(10) Patent No.: US 10,285,140 B2
(45) Date of Patent: May 7, 2019

(54) POWER ESTIMATION METHOD AND APPARATUS

(71) Applicants: Huawei Technologies Co., Ltd., Shenzhen (CN); Fraunhofer-Gesellschaft zur Forderung der angewandten Forschung e.V., Munich (DE)

(72) Inventors: Hongcheng Zhuang, Shenzhen (CN); Andrian Beletchi, Shenzhen (CN); Jietao Zhang, Shenzhen (CN)

(73) Assignees: Huawei Technologies Co., Ltd., Shenzhen (CN); Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 71 days.

(21) Appl. No.: 15/582,373

(22) Filed: Apr. 28, 2017

(65) Prior Publication Data
US 2017/0238267 A1    Aug. 17, 2017

Related U.S. Application Data

(63) Continuation of application No. PCT/CN2014/090123, filed on Oct. 31, 2014.

(51) Int. Cl.
*H04W 52/36* (2009.01)
*H04W 52/00* (2009.01)
(Continued)

(52) U.S. Cl.
CPC ......... *H04W 52/362* (2013.01); *H04W 52/00* (2013.01); *H04W 52/243* (2013.01);
(Continued)

(58) Field of Classification Search
CPC ............. H04W 52/362; H04W 52/343; H04W 52/244; H04W 52/243; H04W 52/367; H04W 52/00
See application file for complete search history.

(56) References Cited

U.S. PATENT DOCUMENTS

2007/0253385 A1* 11/2007 Li .................. H04W 16/06
                                                    370/338
2011/0312368 A1  12/2011 Hamdi et al.
(Continued)

FOREIGN PATENT DOCUMENTS

CN         1862989 A   11/2006
CN       101635988 A    1/2010
(Continued)

*Primary Examiner* — Walli Z Butt
(74) *Attorney, Agent, or Firm* — Leydig, Voit & Mayer, Ltd.

(57) ABSTRACT

Embodiments of the present invention disclose a power estimation method and apparatus. On a premise of controlling interference caused by a second node to a first node to be within a range, a transmit power of the second node can be increased so as to improve communication quality of the second node. A specific solution is: obtaining an estimated load value of each first node in N first nodes according to a transmit power and user service requirements of each first node that are obtained and according to a transmit power set for each second node in M second nodes, and further, respectively using the transmit power set for each second node as an allowed transmit power of each second node according to the estimated load value of each first node in the N first nodes.

10 Claims, 6 Drawing Sheets

(51) Int. Cl.
*H04W 52/24* (2009.01)
*H04W 52/34* (2009.01)

(52) U.S. Cl.
CPC ....... *H04W 52/244* (2013.01); *H04W 52/343* (2013.01); *H04W 52/367* (2013.01)

(56) References Cited

U.S. PATENT DOCUMENTS

2013/0137478 A1* 5/2013 Szufarska ............ H04W 52/143
 455/522
2013/0260815 A1* 10/2013 Wang .................. H04W 52/343
 455/522
2013/0344913 A1 12/2013 Li et al.

FOREIGN PATENT DOCUMENTS

| | | |
|---|---|---|
| CN | 102026207 A | 4/2011 |
| WO | 2010010009 A2 | 1/2010 |
| WO | 2011097822 A1 | 8/2011 |
| WO | 2011157289 A1 | 12/2011 |

* cited by examiner

POWER ESTIMATION METHOD AND APPARATUS

CROSS-REFERENCE TO RELATED APPLICATIONS

This application is a continuation of International Application No. PCT/CN2014/090123, filed on Oct. 31, 2014, the disclosure of which is hereby incorporated by reference in its entirety.

STATEMENT OF JOINT RESEARCH AGREEMENT

The subject matter and the claimed invention were made by or on the behalf of Fraunhofer-Gesellschaft zur Forderung der angewandten Forschung e.V., of Munich, Germany and Huawei Technologies Co., Ltd., of Shenzhen, Guangdong Province, P.R. China. The joint research agreement was in effect on or before the claimed invention was made, and that the claimed invention was made as a result of activities undertaken within the scope of the joint research agreement.

TECHNICAL FIELD

The present invention relates to the communications field, and in particular, to a power estimation method and apparatus.

BACKGROUND ART

With popularization of a wireless network application, a radio spectrum becomes an increasingly scarce resource. In a method in which a spectrum is shared by different wireless networks, a spectrum resource can be more efficiently utilized. However, a problem is that interference exists between the networks that share the spectrum. In practice, some spectrum-resource demanders obtain a spectrum resource by renting the spectrum resource from a spectrum owner, and then construct their respective private wireless networks. Consequently, interference exists between the private wireless network and a network of the spectrum owner, because the spectrum is shared. Generally, a transmit power of a private wireless network node is limited, so as to reduce the interference caused by the private wireless network to the network of the spectrum owner.

In the prior art, for a node in the private wireless network, within a coverage area of the node, access link quality of at least one node in the spectrum owner network is estimated, and on a premise of ensuring that an access link with the worst quality can normally work, a transmit power of the private wireless network node is determined. In a process of implementing the foregoing method, the inventor finds that in the prior art, a transmit power is determined only for a single node in the private wireless network, without considering overall interference caused by a private wireless network node to a network node of the spectrum owner. In addition, the transmit power that is set for the private wireless network node on the premise of ensuring that the access link with the worst quality can normally work is generally relatively low, which causes a poor communication quality of the private wireless network node.

SUMMARY

Embodiments of the present invention provide a power estimation method and apparatus. Interference caused by a private wireless network node to a spectrum owner network node is considered as a whole, and on a premise of controlling the interference caused by the private wireless network node to the spectrum owner network node to be within a range, a transmit power of the private wireless network node is increased so as to improve communication quality of a private wireless network.

To achieve the foregoing objective, the following technical solutions are used in the embodiments of the present invention.

According to a first aspect, a power estimation method includes:

obtaining a transmit power of each first node in N first nodes;

setting a transmit power of each second node in M second nodes, where the second node is a network node that causes interference to at least one first node in the N first nodes;

obtaining user service requirements of each first node in the N first nodes, where user service requirements of an $n^{th}$ first node in the N first nodes are service data rates between the $n^{th}$ first node and users served by the $n^{th}$ first node, and n is a positive integer less than or equal to N;

obtaining an estimated load value of each first node in the N first nodes according to the transmit power of each first node in the N first nodes, the user service requirements of each first node in the N first nodes, and the transmit power of each second node in the M second nodes, where the estimated load value is a value obtained by estimating a physical resource consumption level of the $n^{th}$ first node in the N first nodes; and if the estimated load value of each first node in the N first nodes is less than a first threshold and greater than a second threshold, or the estimated load value of each first node in the N first nodes is less than the first threshold and the transmit power of each second node in the M second nodes is greater than a third threshold, individually using the transmit power of each second node in the M second nodes as an allowed transmit power of each second node in the M second nodes.

With reference to the first aspect, in a first possible implementation manner, the method further includes:

if the estimated load value of the nth first node in the N first nodes is greater than or equal to the first threshold, individually subtracting a preset step-size from the transmit power of each second node in the M second nodes, so as to obtain a new transmit power of each second node in the M second nodes.

With reference to the first aspect, in a second possible implementation manner, the method further includes:

if the estimated load value of the nth first node in the N first nodes is less than or equal to the second threshold, or a transmit power of an $m^{th}$ second node in the M second nodes is less than or equal to the third threshold, individually adding a preset step-size to the transmit power of each second node in the M second nodes, so as to obtain a new transmit power of each second node in the M second nodes.

With reference to the first aspect, in a third possible implementation manner, the method further includes:

obtaining channel gains from each first node and each second node to each user; where the obtaining estimated load value of each first node in the N first nodes according to the transmit power of each first node in the N first nodes, the user service requirements of each first node in the N first nodes, and the transmit power of each second node in the M second nodes includes:

substituting the transmit power of each first node in the N first nodes, the user service requirements of each first node in the N first nodes, and the transmit power of each second node in the M second nodes into a first formula, so as to obtain, by means of calculation, the estimated load value of the nth first node in the N first nodes, where the first formula is:

$$\rho_{i \in M_O} = \min\left\{\frac{\sum_{j \in I} d_j x_{i,j}}{KB\log_2\left(1 + \frac{P_i g_{i,j}}{\sum_{i \in M_O \setminus \{i\}} P_l g_{l,j} \rho_i + \sum_{q \in M_T} P_q g_{q,j} + \sigma^2}\right)}, 1\right\}$$

where i represents an $i^{th}$ first node; l represents an $l^{th}$ first node; q represents a $q^{th}$ second node; $\rho_i$ and $\rho_l$ are respectively estimated load values of the $i^{th}$ first node and the $l^{th}$ first node; I is a set formed by users served by the N first nodes; j represents a user j; $d_j$ is a user service requirement of the user j; $x_{i,j}$ is equal to 1 or 0, where that $x_{i,j}$ is equal to 1 indicates that the $i^{th}$ first node provides a service for the user j, and that $x_{i,j}$ is equal to 0 indicates that the $i^{th}$ first node does not provide a service for the user j;

$$\sum_{j \in I} d_j x_{i,j}$$

is a user service requirement of the $i^{th}$ first node; K is a quantity of system resource blocks; B is a modulation factor; $M_O$ is a set of the N first nodes; $M_T$ is a set of the M second nodes; $P_i$ and $P_l$ are respectively a transmit power of the $i^{th}$ first node and a transmit power of the $l^{th}$ first node; $P_q$ is a transmit power of the $q^{th}$ second node; $g_{i,j}$, $g_{l,j}$, and $g_{q,j}$ are respectively a channel gain from the $i^{th}$ first node to the user j, a channel gain from the $l^{th}$ first node to the user j, and a channel gain from the $q^{th}$ second node to the user j; and $\sigma^2$ is a noise power.

With reference to the first aspect, in a fourth possible implementation manner, the first threshold is a sum of a maximum value in first load values of the N first nodes and a first preset margin, or a product of a maximum value in the first load values of the N first nodes and a first preset coefficient; and a first load value of the $n^{th}$ first node in the N first nodes is a maximum value in actual load values of the $n^{th}$ first node in the N first nodes, where the actual load value of the $n^{th}$ first node is used to indicate an actual physical resource consumption level of the $n^{th}$ first node; or a first load value of the $n^{th}$ first node in the N first nodes is an arithmetic average value of actual load values of the $n^{th}$ first node in the N first nodes; or a first load value of the $n^{th}$ first node in the N first nodes is a sum of $\rho_n \times \omega_1$ and $\rho_f \times \omega_2$, where $\rho_n$ is a maximum value in actual load values of the $n^{th}$ first node in the N first nodes, and $\rho_f$ is a predicted load value of the $n^{th}$ first node in the N first nodes, where the predicted load value of the $n^{th}$ first node in the N first nodes is a value obtained by predicting an actual load value of the $n^{th}$ first node, $\omega_1$ is a first weighting coefficient, and $\omega_2$ is a second weighting coefficient.

With reference to the first aspect, in a fifth possible implementation manner, the method further includes:

sending allowed transmit power information of the $m^{th}$ second node in the M second nodes to the $m^{th}$ second node, where the allowed transmit power information is used to indicate the allowed transmit power of the $m^{th}$ second node.

According to a second aspect, a network device includes a receiver, a processor, a memory, and a bus, and the receiver, the processor, and the memory are connected to each other by using the bus, where the receiver is configured to obtain a transmit power of each first node in N first nodes;

the processor is configured to set a transmit power of each second node in M second nodes, where the second node is a network node that causes interference to at least one first node in the N first nodes;

the processor is further configured to obtain user service requirements of each first node in the N first nodes, where user service requirements of an $n^{th}$ first node in the N first nodes are service data rates between the $n^{th}$ first node and users served by the $n^{th}$ first node, and n is a positive integer less than or equal to N;

the processor is further configured to obtain an estimated load value of each first node in the N first nodes according to the transmit power of each first node in the N first nodes, the user service requirements of each first node in the N first nodes, and the transmit power of each second node in the M second nodes, where the estimated load value is a value obtained by estimating a physical resource consumption level of the $n^{th}$ first node in the N first nodes; and the processor is further configured to: when the estimated load value of each first node in the N first nodes is less than a first threshold and greater than a second threshold, or when the estimated load value of each first node in the N first nodes is less than the first threshold and the transmit power of each second node in the M second nodes is greater than a third threshold, individually use the transmit power of each second node in the M second nodes as an allowed transmit power of each second node in the M second nodes.

With reference to the second aspect, in a first possible implementation manner, the processor is further configured to: when the estimated load value of the $n^{th}$ first node in the N first nodes is greater than or equal to the first threshold, individually subtract a preset step-size from the transmit power of each second node in the M second nodes, so as to obtain a new transmit power of each second node in the M second nodes.

With reference to the second aspect, in a second possible implementation manner, the processor is further configured to: when the estimated load value of the $n^{th}$ first node in the N first nodes is less than or equal to the second threshold, or when a transmit power of an $m^{th}$ second node in the M second nodes is less than or equal to the third threshold, individually add a preset step-size to the transmit power of each second node in the M second nodes, so as to obtain a new transmit power of each second node in the M second nodes.

With reference to the second aspect, in a third possible implementation manner, the processor is further configured to obtain channel gains from each first node and each second node to each user; and the processor is further configured to obtain, by means of calculation according to a first formula, the estimated load value of the $n^{th}$ first node in the N first nodes, where the first formula is $$\rho_{i \in M_O} = \min\left\{\frac{\sum_{j \in I} d_j x_{i,j}}{KB\log_2\left(1 + \frac{P_i g_{i,j}}{\sum_{i \in M_O \setminus \{i\}} P_l g_{l,j} \rho_i + \sum_{q \in M_T} P_q g_{q,j} + \sigma^2}\right)}, 1\right\}$$

where i represents an $i^{th}$ first node; l represents an $l^{th}$ first node; q represents a $q^{th}$ second node; $\rho_i$ and $\rho_l$ are respectively estimated load values of the $i^{th}$ first node and the $l^{th}$ first node; I is a set formed by users served by the N first nodes; j represents a user j; $d_j$ is a user service requirement of the user j; $x_{i,j}$ is equal to 1 or 0, where that $x_{i,j}$ is equal to 1 indicates that the $i^{th}$ first node provides a service for the user j, and that $x_{i,j}$ is equal to 0 indicates that the $i^{th}$ first node does not provide a service for the user j;

$$\sum_{j \in I} d_j x_{i,j}$$

is a user service requirement of the $i^{th}$ first node; K is a quantity of system resource blocks; B is a modulation factor; $M_O$ is a set of the N first nodes; $M_T$ is a set of the M second nodes; $P_i$ and $P_l$ are respectively a transmit power of the $i^{th}$ first node and a transmit power of the $l^{th}$ first node; $P_q$ is a transmit power of the $q^{th}$ second node; $g_{i,j}$, $g_{l,j}$, and $g_{q,j}$ are respectively a channel gain from the $i^{th}$ first node to the user j, a channel gain from the $l^{th}$ first node to the user j, and a channel gain from the $q^{th}$ second node to the user j; and $\sigma^2$ is a noise power.

With reference to the second aspect, in a fourth possible implementation manner, the processor is further configured to use a sum of a maximum value in first load values of the N first nodes and a first preset margin, or a product of a maximum value in the first load values of the N first nodes and a first preset coefficient as the first threshold, where a first load value of the $n^{th}$ first node in the N first nodes is a maximum value in actual load values of the $n^{th}$ first node in the N first nodes, where the actual load value of the $n^{th}$ first node is used to indicate an actual physical resource consumption level of the $n^{th}$ first node; or a first load value of the $n^{th}$ first node in the N first nodes is an arithmetic average value of actual load values of the $n^{th}$ first node in the N first nodes; or a first load value of the $n^{th}$ first node in the N first nodes is a sum of $\rho_n \times \omega_1$ and $\rho_f \times \omega_2$, where $\rho_n$ is a maximum value in actual load values of the $n^{th}$ first node in the N first nodes, and $\rho_f$ is a predicted load value of the $n^{th}$ first node in the N first nodes, where the predicted load value of the $n^{th}$ first node in the N first nodes is a value obtained by predicting an actual load value of the $n^{th}$ first node, $\omega_1$ is a first weighting coefficient, and $\omega_2$ is a second weighting coefficient.

With reference to the second aspect, in a fifth possible implementation manner, the network device further includes a transmitter, configured to send allowed transmit power information of the $m^{th}$ second node in the M second nodes to the $m^{th}$ second node, where the allowed transmit power information is used to indicate the allowed transmit power of the $m^{th}$ second node.

According to a third aspect, a network device includes a receiving unit and a processing unit, where the receiving unit is configured to obtain a transmit power of each first node in N first nodes;

the processing unit is configured to set a transmit power of each second node in M second nodes, where the second node is a network node that causes interference to at least one first node in the N first nodes;

the processing unit is further configured to obtain user service requirements of each first node in the N first nodes, where user service requirements of an $n^{th}$ first node in the N first nodes are service data rates between the $n^{th}$ first node and users served by the $n^{th}$ first node, and n is a positive integer less than or equal to N;

the processing unit is further configured to obtain an estimated load value of each first node in the N first nodes according to the transmit power of each first node in the N first nodes, the user service requirements of each first node in the N first nodes, and the transmit power of each second node in the M second nodes, where the estimated load value is a value obtained by estimating a physical resource consumption level of the $n^{th}$ first node in the N first nodes; and the processing unit is further configured to: when the estimated load value of each first node in the N first nodes is less than a first threshold and greater than a second threshold, or when the estimated load value of each first node in the N first nodes is less than the first threshold and the transmit power of each second node in the M second nodes is greater than a third threshold, individually use the transmit power of each second node in the M second nodes as allowed transmit power of each second node in the M second nodes.

With reference to the third aspect, in a first possible implementation manner, the processing unit is further configured to: when the estimated load value of the $n^{th}$ first node in the N first nodes is greater than or equal to the first threshold, individually subtract a preset step-size from the transmit power of each second node in the M second nodes, so as to obtain a new transmit power of each second node in the M second nodes.

With reference to the third aspect, in a second possible implementation manner, the processing unit is further configured to: when the estimated load value of the $n^{th}$ first node in the N first nodes is less than or equal to the second threshold, or when a transmit power of an $m^{th}$ second node in the M second nodes is less than or equal to the third threshold, individually add a preset step-size to the transmit power of each second node in the M second nodes, so as to obtain a new transmit power of each second node in the M second nodes.

With reference to the third aspect, in a third possible implementation manner, the processing unit is further configured to obtain channel gains from each first node and each second node to each user; and the processing unit is further configured to obtain, by means of calculation according to a first formula, the estimated load value of the $n^{th}$ first node in the N first nodes, where the first formula $$\rho_{i \in M_O} = \min \left\{ \frac{\sum_{j \in I} d_j x_{i,j}}{KB \log_2 \left(1 + \frac{P_i g_{i,j}}{\sum_{l \in M_O \setminus \{i\}} P_l g_{l,j} \rho_l + \sum_{q \in M_T} P_q g_{q,j} + \sigma^2}\right)}, 1 \right\}$$

where i represents an $i^{th}$ first node; l represents an $l^{th}$ first node; q represents a $q^{th}$ second node; $\rho_i$ and $\rho_l$ are respectively estimated load values of the $i^{th}$ first node and the $l^{th}$ first node; I is a set formed by users served by the N first nodes; j represents a user j; $d_j$ is a user service requirement of the user j; $x_{i,j}$ is equal to 1 or 0, where that $x_{i,j}$ is equal to 1 indicates that the $i^{th}$ first node provides a service for the user j, and that $x_{i,j}$ is equal to 0 indicates that the $i^{th}$ first node does not provide a service for the user j;

$$\sum_{j \in I} d_j x_{i,j}$$

is a user service requirement of the $i^{th}$ first node; K is a quantity of system resource blocks; B is a modulation factor; $M_O$ is a set of the N first nodes; $M_T$ is a set of the M second nodes; $P_i$ and $P_l$ are respectively a transmit power of the $i^{th}$ first node and a transmit power of the $l^{th}$ first node; $P_q$ is a transmit power of the $q^{th}$ second node; $g_{i,j}$, $g_{l,j}$, and $g_{q,j}$ are respectively a channel gain from the $i^{th}$ first node to the user j, a channel gain from the $l^{th}$ first node to the user j, and a channel gain from the $q^{th}$ second node to the user j; and $\sigma^2$ is a noise power.

With reference to the third aspect, in a fourth possible implementation manner, the processing unit is further configured to use a sum of a maximum value in first load values of the N first nodes and a first preset margin, or a product of a maximum value in the first load values of the N first nodes and a first preset coefficient as the first threshold, where a first load value of the $n^{th}$ first node in the N first nodes is a maximum value in actual load values of the $n^{th}$ first node in the N first nodes, where the actual load value of the $n^{th}$ first node is used to indicate an actual physical resource consumption level of the $n^{th}$ first node; or a first load value of the $n^{th}$ first node in the N first nodes is an arithmetic average value of actual load values of the $n^{th}$ first node in the N first nodes; or a first load value of the $n^{th}$ first node in the N first nodes is a sum of $\rho_n \times \omega_1$ and $\rho_f \times \omega_2$, where $\rho_n$ is a maximum value in actual load values of the $n^{th}$ first node in the N first nodes, and $\rho_f$ is a predicted load value of the $n^{th}$ first node in the N first nodes, where the predicted load value of the $n^{th}$ first node in the N first nodes is a value obtained by predicting an actual load value of the $n^{th}$ first node, $\omega_1$ is a first weighting coefficient, and $\omega_2$ is a second weighting coefficient.

With reference to the third aspect, in a fifth possible implementation manner, the network device further includes a sending unit, configured to send allowed transmit power information of the $m^{th}$ second node in the M second nodes to the $m^{th}$ second node, where the allowed transmit power information is used to indicate an allowed transmit power of the $m^{th}$ second node.

According to the power estimation method and apparatus provided in the embodiments of the present invention, a transmit power of each first node in N first nodes is obtained; user service requirements of each first node in the N first nodes are obtained; a transmit power of each second node in M second nodes is set; and an estimated load value of each first node in the N first nodes is obtained according to the transmit power of each first node in the N first nodes, the user service requirements of each first node in the N first nodes, and the transmit power of each second node in the M second nodes, so as to determine an allowed transmit power of each second node in the M second nodes. In an application scenario in which both M and N are integers greater than 1, that is, in an application scenario in which multiple first nodes and multiple second nodes exist, different from the prior art in which a transmit power of a second node is determined for a single second node, the power estimation method provided in the embodiments of the present invention takes interference caused by the M second nodes to the N first nodes into consideration as a whole, and on a premise of ensuring that the estimated load values of the first nodes are less than a first threshold, increases an allowed transmit power of a second node as much as possible, so as to improve communication quality of the second node. When M is equal to 1, in the power estimation method provided in the embodiments of the present invention, a problem in the prior art that a transmit power that is set for a second node according to access link quality is relatively low is avoided.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
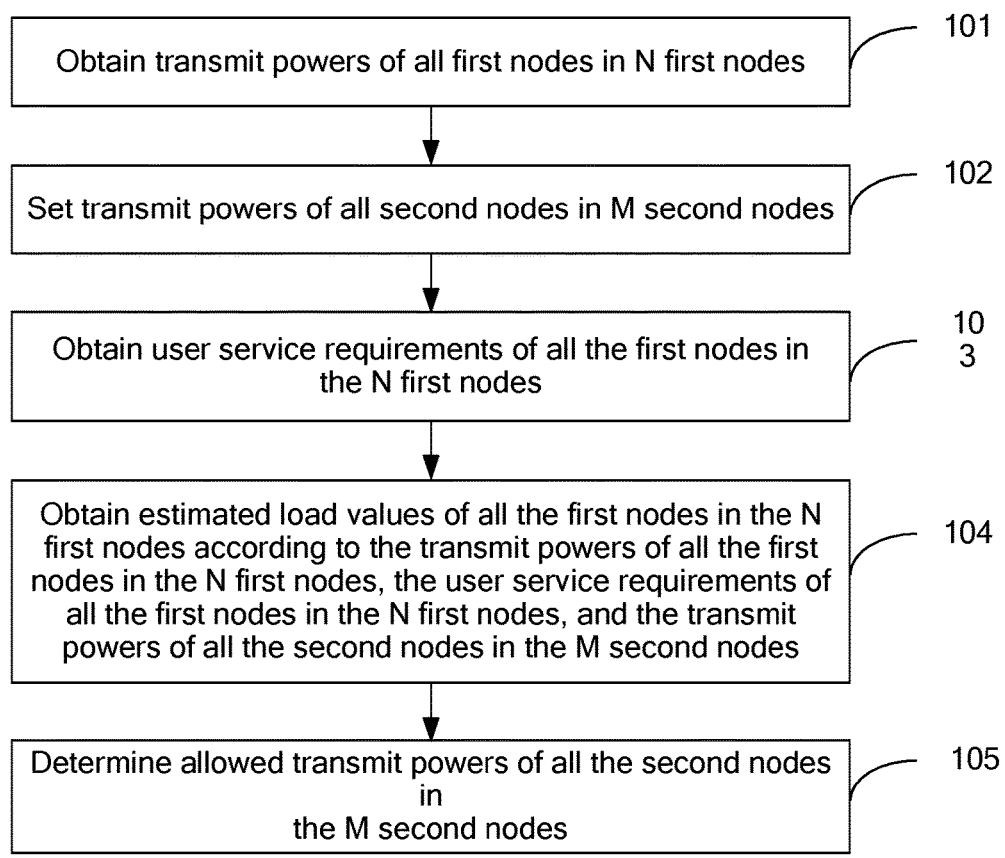
FIG. 1 is a schematic flowchart of a power estimation method according to an embodiment of the present invention.

An embodiment of the present invention provides a power estimation method, which is used to limit a transmit power of a wireless network node that generates interference. For example, in a heterogeneous network (HetNet), some non-planned nodes exist, such as a base station established by renting a spectrum, or an individual wireless access point, such as a home base station. Because there are overlapping parts between spectrums of these non-planned nodes and a planned node deployed by an operator, interference is caused to the planned node. Interference to the planned node may be reduced by appropriately limiting a transmit power of the non-planned node. In this embodiment, interference caused by the second node to a first node is reduced by limiting a transmit power of a second node. Preferably, the first node may be a planned node, and the second node may be a non-planned node. In a wireless network, a transmit power of a node may be monitored and adjusted by using a network device, and the power estimation method provided in this embodiment of the present invention is applied to the network device. Referring to FIG. 1, the method includes the following steps.

101. Obtain a transmit power of each first node in N first nodes.

N is an integer greater than 0. The first node is a node in the wireless network, for example, the first node may be a base station. A transmit power of a first node is a power used by the first node to transmit a signal, where the signal includes a control signal, a service data signal, and the like. In this embodiment, a level of a signal transmit power is discussed, and no limitation is imposed on specific content carried by the signal.

Optionally, the network device may obtain the transmit power of each first node in the N first nodes by querying an internal record or sending query messages to each first node in the N first nodes.

102. Set a transmit power of each second node in M second nodes.

M is an integer greater than 0, and the second node is a network node that causes interference to at least one first node in the N first nodes; for example, in an application scenario, the first node is a planned node, and the second node is a non-planned node that causes interference to the planned node.

When the second node causes interference to the first node, the transmit power of the second node is limited so as to control the interference caused by the second node to the first node to be within a range. A lower transmit power of the second node indicates lower interference caused by the second node to the first node and worse communication quality of the second node; therefore, an appropriate transmit power needs to be determined for the second node.

103. Obtain user service requirements of each first node in the N first nodes.

A user service requirement of an $n^{th}$ first node in the N first nodes is a service data rate between the $n^{th}$ first node and a user served by the $n^{th}$ first node. The user may be a mobile phone, or may be another mobile data terminal device. When the $n^{th}$ first node serves multiple users, user service requirements of the $n^{th}$ first node are a sum of the service data rate of the $n^{th}$ first node and the multiple users served by the $n^{th}$ first node.

Each first node may provide a service for multiple users at a time. The service provided by the first node may be specifically a mobile call, a mobile networking, or the like, and different services need to occupy different quantities of physical resources. Optionally, the quantity of physical resources may include information about a timeslot, bandwidth, and the like.

Optionally, each first node in N first nodes collects, within a period of time, statistics about service requirements of all users served by the first node; the network device receives statistical results sent by each first node in the N first nodes; and a mathematical model of the user service requirement is established according to the statistical results. The service requirement of each user served by each first node in the N first nodes is obtained by means of estimation by using the mathematical model, the service requirement of each user served by the node is summed so as to obtain user service requirements of the node.

Optionally, there is no sequence between steps 101 to 103.

104. Obtain an estimated load value of each first node in the N first nodes according to the transmit power of each first node in the N first nodes, the user service requirements of each first node in the N first nodes, and the transmit power of each second node each second node in the M second nodes.

The estimated load value of the $n^{th}$ first node in the N first nodes is a value obtained by estimating an actual load value of the $n^{th}$ first node. The actual load value of the $n^{th}$ first node in the N first nodes is used to indicate an actual physical resource consumption level of the $n^{th}$ first node, and the estimated load value of the $n^{th}$ first node in the N first nodes is a value obtained by estimating a physical resource consumption level of the $n^{th}$ first node in the N first nodes. The transmit power of each second node in the M second nodes is the transmit power set in step 102.

The actual load value of the $n^{th}$ first node in the N first nodes may be specifically a ratio of a quantity of physical resources of the first node that are actually occupied to a total quantity of physical resources that can be provided by the first node. The actual load value is greater than or equal to 0, and less than or equal to 1. During estimation of a requirement of a user on a physical resource of a first node is estimated, when a quantity of the physical resource requirement estimated is greater than or equal to a total quantity of physical resources that can be provided by the first node, an estimated load value is 1. Optionally, an estimated load value of each first node in the N first nodes may be calculated by using a second formula, where the second formula is specifically:

$$\rho_{i \in M_O} = \min\left\{ \frac{\sum_{j \in I} d_j x_{i,j}}{KB\log_2\left(1 + \frac{P_i}{\sum_{l \in M_O \setminus \{i\}} P_l \rho_l + \sum_{q \in M_T} P_q + \sigma^2}\right)}, 1 \right\}$$

where i represents an $i^{th}$ first node; l represents an $l^{th}$ first node; q represents a $q^{th}$ second node; $\rho_i$ and $\rho_l$ are respectively estimated load values of the $i^{th}$ first node and the $l^{th}$ first node; I is a set formed by users served by the N first nodes; j represents a user j; $d_j$ is a user service requirement of the user j; $x_{i,j}$ is equal to 1 or 0, where that $x_{i,j}$ is equal to 1 indicates that the $i^{th}$ first node provides a service for the user j, and that $x_{i,j}$ is equal to 0 indicates that the $i^{th}$ first node does not provide a service for the user j;

$$\sum_{j \in I} d_j x_{i,j}$$

is a user service requirement of the $i^{th}$ first node; K is a quantity of system resource blocks; B is a modulation factor; $M_O$ is a set of the N first nodes; $M_T$ is a set of the M second nodes; $P_i$, $P_l$, and $P_q$ are respectively a transmit power of the $i^{th}$ first node, a transmit power of the $l^{th}$ first node, and a transmit power of the $q^{th}$ second node; and $\sigma^2$ is a noise power.

In the second formula, it may be learned from $l \in M_O \setminus \{i\}$ that the estimated load value of the $i^{th}$ first node in the N first nodes is related to an estimated load value of another first node other than the $i^{th}$ first node in the N first nodes. Therefore, the second formula is applied to each first node in the N first nodes, so as to obtain equations related to the estimated load value of each first node in the N first nodes, and obtain the estimated load value of each first node in the N first nodes by solving the equations.

105. Determine an allowed transmit power of each second node in the M second nodes.

The allowed transmit power of an $m^{th}$ second node in the M second nodes is used to indicate that a power used by the $m^{th}$ second node to transmit a signal is required to be less than or equal to the allowed transmit power of the $m^{th}$ second node.

Specifically, in a first application scenario, if the estimated load value of each first node in the N first nodes is less than a first threshold and greater than a second threshold, the transmit power of each second node in the M second nodes is individually determined as the allowed transmit power of each second node in the M second nodes.

The first threshold is a preset maximum load value of the first node. If the estimated load value of the $n^{th}$ first node in the N first nodes is greater than or equal to the first threshold, the transmit power of each second node in the M second nodes is reduced to lower the interference caused by the second node to the first node, so as to lower the estimated load value of the first node, so that the estimated load value of each first node in the N first nodes is less than the first threshold.

The second threshold is less than the first threshold, and a difference between the first threshold and the second threshold represents a variation range of the estimated load value of each first node in the N first nodes. If the estimated load value of the $n^{th}$ first node in the N first nodes is less than the second threshold, a transmit power of a second node is increased so as to improve communication quality of the second node. That the estimated load value of the $n^{th}$ first node in the N first nodes falls within the variation range indicates that on a premise of ensuring communication quality of the first node, the second node achieves the best communication quality. Optionally, for different first nodes, the first threshold may be set to a same value, or may be set to different values; optionally, the second threshold may be 90% of the first threshold. Certainly, a specific value of the second threshold may be set according to an actual situation, and the present invention imposes no limitation on the specific value of the second threshold.

Alternatively, in a second application scenario, if the estimated load value of each first node in the N first nodes is less than a first threshold and the transmit power of each second node in the M second nodes is greater than a third threshold, the transmit power of each second node in the M second nodes is individually determined as the allowed transmit power of each second node in the M second nodes.

When the transmit power of each second node in the M second nodes is greater than the third threshold, communication quality of the $m^{th}$ second node in the M second nodes can meet a preset requirement, so as to ensure normal communication of the $m^{th}$ second node.

If the estimated load value of the $n^{th}$ first node in the N first nodes is greater than or equal to the first threshold, the transmit power of each second node in the M second nodes is reduced so as to lower the estimated load value of each first node in the N first nodes. If the estimated load value of the $n^{th}$ first node in the N first nodes is less than the second threshold, or the transmit power of the $m^{th}$ second node in the M second nodes is less than the third threshold, the transmit power of each second node in the M second nodes is increased so as to improve the communication quality of each second node in the M second nodes. Steps 103 to 105 are cyclically executed so as to adjust the transmit power of each second node in the M second nodes, and allowed transmit power for each second node in the M second nodes is finally determined.

In the prior art, a method for determining a transmit power of a second node is designed only for a single second node, in which estimation is performed on access link quality of at least one first node within a coverage area of the second node, and a transmit power range that is determined for the second node according to an access link with the worst quality is generally relatively low, and consequently communication quality of the second node is poor. According to the power estimation method provided in this embodiment of the present invention, a transmit power of each first node in N first nodes is obtained; user service requirements of each first node in the N first nodes are obtained; a transmit power of each second node in M second nodes is set; and an estimated load value of each first node in the N first nodes is obtained according to the transmit power of each first node in the N first nodes, the user service requirements of each first node in the N first nodes, and the transmit power of each second node in the M second nodes, so as to determine an allowed transmit power of each second node in the M second nodes. Different from a method in the prior art in which a transmit power of a second node is determined for a single second node, the power estimation method provided in this embodiment of the present invention takes load values of the N first nodes and transmit powers of the M second nodes into consideration, and ensures that the estimated load values of the first nodes are less than the first threshold, that is, controls interference caused by a second node to a first node to be within a range, and increases an allowed transmit power of the second node as much as possible, so as to improve the communication quality of the second node.

Figure 2:
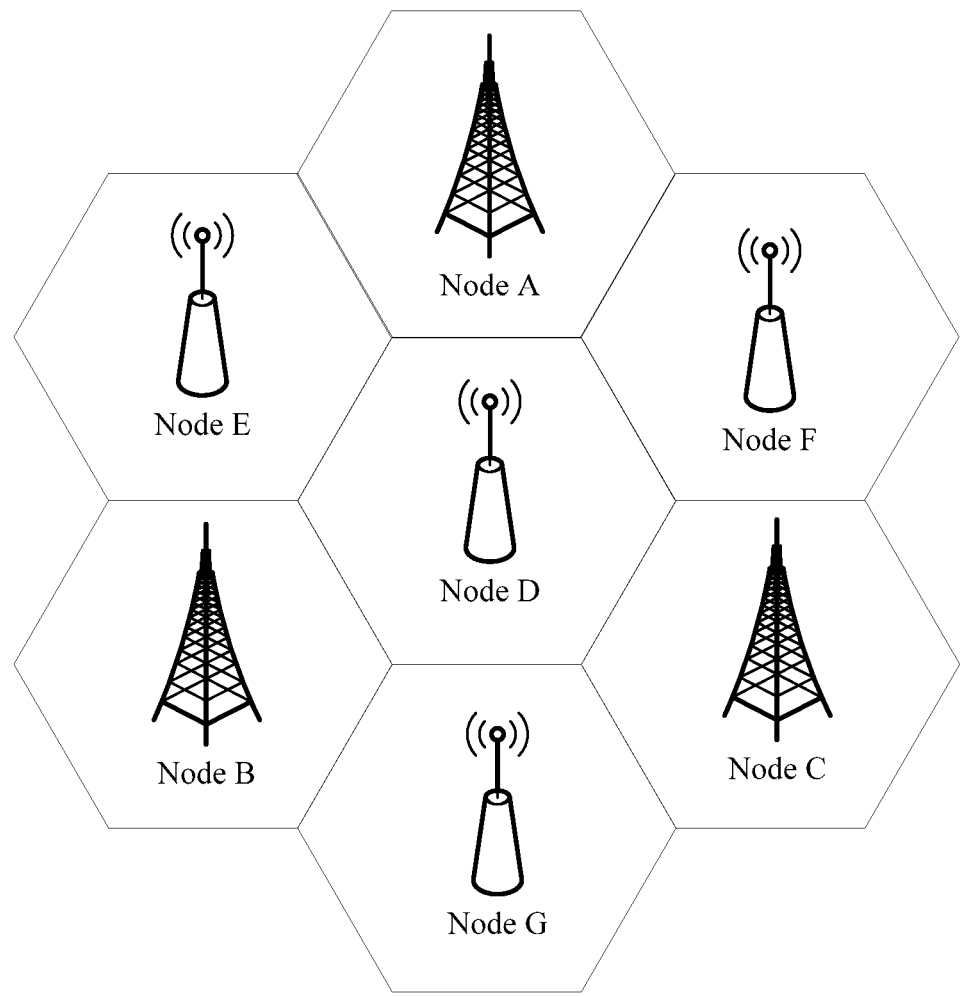
FIG. 2 is a schematic diagram of an application scenario of a power estimation method according to another embodiment of the present invention.
Figure 3:
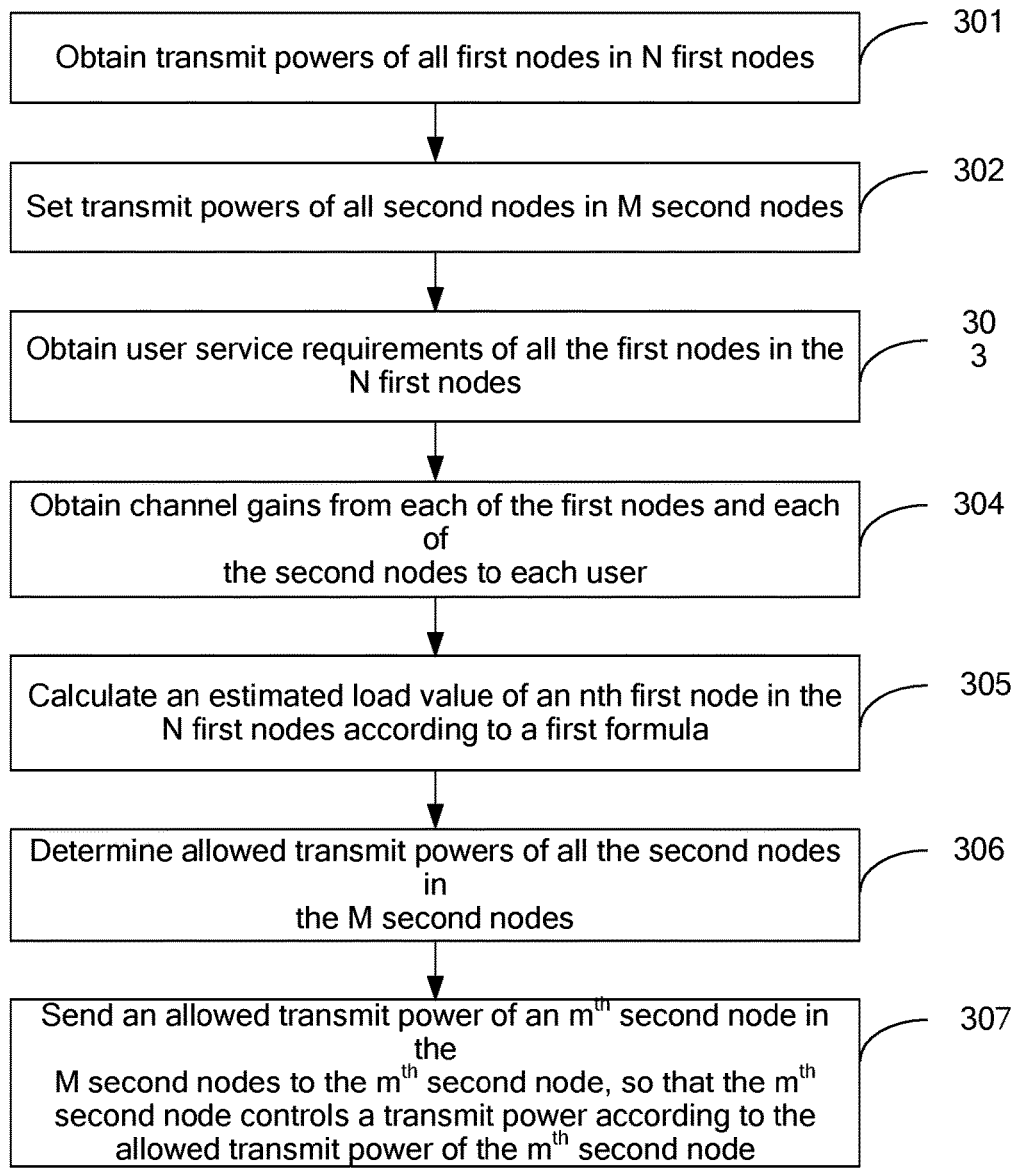
FIG. 3 is a schematic flowchart of a power estimation method according to another embodiment of the present invention.

Another embodiment of the present invention provides a power estimation method, which is applied to an application scenario shown in FIG. 2. As shown in FIG. 2, a node A, a node B, and a node C are nodes in a wireless network of an operator. The wireless network operator has his own radio spectrum resource, and some spectrum resource demanders rent a spectrum from the operator so as to set up a private wireless network. A node D, a node E, a node F, and a node G are nodes in the private wireless network. Because the spectrum is shared, interference exists between the private wireless network node and the operator wireless network node. As shown in FIG. 3, a power estimation method provided in another embodiment of the present invention includes the following steps.

301. Obtain a transmit power of each first node in N first nodes.

N is an integer greater than 0, and a transmit power of each first node in the N first nodes is a power used by the first node to transmit a signal. Optionally, the first node may be an access point in a wireless network of the operator wireless network, and the access point in the wireless network may be specifically a base station in the wireless network. Referring to FIG. 2, the node A, the node B, and the node C are first nodes.

Optionally, the network device may obtain the transmit power of each first node in the N first nodes by querying an internal record or sending query messages to each first node in the N first nodes.

302. Set a transmit power of each second node in M second nodes.

The second node is a network node that causes interference to the first node and whose transmit power needs to be limited. M is an integer greater than 0. The transmit power of the second node is limited so as to control the interference caused by the second node to the first node to be within a range. A lower transmit power of the second node indicates lower interference caused by the second node to the first node and worse communication quality of the second node; therefore, an appropriate transmit power needs to be determined for the second node.

303. Obtain user service requirements of each first node in the N first nodes.

Optionally, each first node in the N first nodes collects, within a period of time, statistics about users served by the first node, and for a user, collects a service requirement of the user. The network device receives statistical results from each first node in the N first nodes; a mathematical model of the user service requirement is established according to the statistical results; the user service requirement is used as a random variable in probability statistics; and the user service requirements of each first node in the N first nodes are estimated by using the mathematical model, so as to obtain the user service requirements of each first node in the N first nodes.

304. Obtain channel gains from each first node and each second node to each user.

A channel gain is a ratio of an actual receive power of a user to a transmit power of a node, that is, the actual receive power of the user is a product of the transmit power of the node and the channel gain from the node to the user. An $n^{th}$ first node is used as an example. A transmit power of the node is $P_1$, and for a user j served by the node, an actual receive power of the user is $P_2$; a channel gain from the $n^{th}$ first node to the user j is: $g=P_2/P_1$, then $P_2=P_1 g$.

A longer distance between a node and a user indicates a lower channel gain from the node to the user. Therefore, the channel gains from each first node and each second node to each user may be obtained according to user location information of each first node in the N first nodes and location information of each second node in the M second nodes, where user location information of one node is used to indicate a distance between a user served by the node and the node. Specifically, the location information may be coordinates of a user location, and a distance between a user and a node serving the user may be determined according to coordinates of a user location. Optionally, with reference to step 303, statistics collection is performed on the user location information, and a mathematical model of the user location information is established, so as to obtain user location information of each first node in the N first nodes.

Optionally, with reference to the application scenario shown in FIG. 2, the second node is an access point in the private wireless network, and the network device may obtain location information of each second node in the M second nodes from an operation, administration and maintenance (OAM) center of the private wireless network. Specifically, the network device proactively sends a message to the operation, administration and maintenance center of the private wireless network, so as to query location information of a private wireless network node in a working state. Alternatively, the operation, administration and maintenance center of the private wireless network periodically sends location information of a private wireless network node in a working state to the network device. Alternatively, when location information of a private wireless network node in a working state is updated, the operation, administration and maintenance center of the private wireless network sends updated location information to the network device.

305. Calculate an estimated load value of an $n^{th}$ first node in the N first nodes according to a first formula.

The estimated load value is a value obtained by estimating an actual load value. The actual load value of the $n^{th}$ first node in the N first nodes is a ratio of a quantity of physical resources of the $n^{th}$ first node that are actually occupied to a total quantity of physical resources that can be provided by the $n^{th}$ first node.

Specifically, the transmit power of each first node in the N first nodes, the user service requirements of each first node in the N first nodes, and the transmit power of each second node in the M second nodes are substituted into a first formula, so as to obtain, by means of calculation, the estimated load value of the $n^{th}$ first node in the N first nodes, where the first formula is:

$$\rho_{i \in M_O} = \min\left\{\frac{\sum_{j \in I} d_j x_{i,j}}{KB\log_2\left(1 + \frac{P_i g_{i,j}}{\sum_{l \in M_O \setminus \{i\}} P_l g_{l,j} \rho_l + \sum_{q \in M_T} P_q g_{q,j} + \sigma^2}\right)}, 1\right\}$$

where i represents an $i^{th}$ first node; l represents an $l^{th}$ first node; q represents a $q^{th}$ second node; $\rho_i$ and $\rho_l$ are respectively estimated load values of the $i^{th}$ first node and the $l^{th}$ first node; I is a set formed by users served by the N first nodes; j represents a user j; $d_j$ is a user service requirement of the user j; $x_{i,j}$ is equal to 1 or 0, where that $x_{i,j}$ is equal to 1 indicates that the $i^{th}$ first node provides a service for the user j, and that $x_{i,j}$ is equal to 0 indicates that the $i^{th}$ first node does not provide a service for the user j;

$$\sum_{j \in I} d_j x_{i,j}$$

is a user service requirement of the $i^{th}$ first node; K is a quantity of system resource blocks; B is a modulation factor; $M_O$ is a set of the N first nodes; $M_T$ is a set of the M second nodes; $P_i$ and $P_l$ are respectively a transmit power of the $i^{th}$ first node and a transmit power of the $l^{th}$ first node; $P_q$ is a transmit power of the $q^{th}$ second node; $g_{i,j}$, $g_{l,j}$, and $g_{q,j}$ are respectively a channel gain from the $i^{th}$ first node to the user j, a channel gain from the $l^{th}$ first node to the user j, and a channel gain from the $q^{th}$ second node to the user j; and $\sigma^2$ is a noise power.

It may be learned from the first formula that the estimated load value of the $i^{th}$ first node in the N first nodes is related to an estimated load value of another first node other than the $i^{th}$ first node in the N first nodes. Therefore, the first formula is applied to each first node in the N first nodes, so as to obtain equations related to the estimated load value of each first node in the N first nodes, and obtain the estimated load value of each first node in the N first nodes by solving the equations.

With reference to step 303, the user location information and the user service requirements of each first node are random variables. Therefore, based on the user location information and the user service requirements of each first node in the N first nodes, the estimated load value of each first node in the N first nodes obtained by using the first formula are also random variables. The estimated load value of each first node in the N first nodes is obtained by using the first formula, that is, estimation is preformed once on the estimated load value of each first node in the N first nodes.

To improve accuracy of the estimated load value of each first node in the N first nodes, the estimated load value of each first node in the N first nodes may be estimated s times, that is, step 303 to step 305 are cyclically executed s times.

The estimated load value of each first node in the N first nodes is obtained in a $k^{th}$ estimation in the s estimations, among which a maximum value is used as an estimated load value of the $k^{th}$ estimation. Each estimation in the s estimations is an independent event, and estimated load values of all the estimations meet a same probability distribution function F(x), that is, estimated load values of all the estimations in the s estimations are independent and identically distributed random variables. s estimated load values obtained in the s estimations are sequenced in ascending order: $\rho_{1,s}, \rho_{2,s}, \rho_{3,s}, \ldots \rho_{k,s}, \ldots, \rho_{s,s}$. For a given fraction r:

$$P(\rho_{k,s} > F^{-1}(r)) = P(F(\rho_{k,s}) > r) = 1 - \sum_{i=k}^{s} \binom{s}{i} r^i (1-r)^{s-i},$$

where P indicates a probability that the estimated load value in the $k^{th}$ estimation in the s estimations is less than $\rho_{k,s}$. When r=0.95 and k=s=100:

$$P(\rho_{k,s} > F^{-1}(r)) = P(F(\rho_{k,s}) > r) = 1 - \sum_{i=k}^{s} \binom{s}{i} r^i (1-r)^{s-i} = 0.99,$$

indicating that a probability that in the s estimated load values obtained in the s estimations, 95% of the estimated load values is less than $\rho_{s,s}$ is 99%, that is, a probability that $\rho_{s,s}$ is greater than the 95% of the estimated load value is 99%, and $\rho_{s,s}$ may be considered as a maximum value of the estimated load values.

306. Determine an allowed transmit power of each second node in the M second nodes.

The allowed transmit power of an $m^{th}$ second node in the M second nodes is used to indicate that a power used by the $m^{th}$ second node to transmit a signal is required to be less than or equal to the allowed transmit power of the $m^{th}$ second node.

Optionally, this embodiment provides two possible implementation manners, which are used to determine the allowed transmit power of each second node in the M second nodes.

In a first implementation manner: If the estimated load value of each first node in the N first nodes is less than a first threshold and greater than a second threshold, the transmit power of each second node in the M second nodes is individually used as the allowed transmit power of each second node in the M second nodes, where the second threshold is less than the first threshold.

The first threshold is a preset maximum estimated load value of the first node; the second threshold is less than the first threshold. A difference between the first threshold and the second threshold represents a variation range of the estimated load value of each first node in the N first nodes. When $\rho_{s,s}$ is less than the first threshold, and the estimated load value of each first node in the N first nodes is greater than the second threshold, the transmit power of each second node in the M second nodes in step 302 is determined as the allowed transmit power of each second node in the M second nodes. Optionally, the second threshold may be 90% of the first threshold. If the estimated load value of each first node in the N first nodes is greater than 90% of the first threshold and less than the first threshold, the transmit power of each second node in the M second nodes in step 302 is determined as the allowed transmit power of each second node in the M second nodes. Certainly, a specific value of the second threshold may be set according to an actual situation, and the present invention imposes no limitation on the specific value of the second threshold.

If $\rho_{s,s}$ is greater than or equal to the first threshold, it indicates that the overall transmit power of each second node in the M second nodes in step 302 is relatively high. In this case, a preset step-size is individually subtracted from the transmit power of each second node in the M second nodes, so as to obtain a new transmit power of each second node in the M second nodes, and the procedure is re-executed from step 302. With reference to step 302, a transmit power of the $m^{th}$ second node in the M second nodes is less than or equal to a maximum transmit power of the $m^{th}$ second node. Different transmit powers may be set for different second nodes in the M second nodes. Accordingly, for different second nodes, a specific value of the preset step-size may be different.

Alternatively, the estimated load value of the $n^{th}$ first node in the N first nodes is less than or equal to the second threshold, indicating that the overall transmit power set for each second node in the M second nodes in step 302 is relatively low. In this case, a preset step-size is individually added to the transmit power of each second node in the M second nodes, so as to obtain a new transmit power of each second node in the M second nodes, and the procedure is re-executed from step 302.

In a second implementation manner: If the estimated load value of each first node in the N first nodes is less than a first threshold and the transmit power of each second node in the M second nodes is greater than a third threshold, the transmit power of each second node in the M second nodes is individually used as the allowed transmit power of each second node in the M second nodes.

If $\rho_{s,s}$ is greater than or equal to the first threshold, it indicates that the overall transmit power set for each second node in the M second nodes in step 302 is relatively high. In this case, a preset step-size is individually subtracted from the transmit power of each second node in the M second nodes, so as to obtain a new transmit power of each second node in the M second nodes, and the procedure is re-executed from step 302.

If the transmit power of the $m^{th}$ second node in the M second nodes is less than or equal to a third threshold, it indicates that the overall transmit power set for each second node in the M second nodes in step 302 is relatively low. In this case, a preset step-size is individually added to the transmit power of each second node in the M second nodes, so as to obtain a new transmit power of each second node in the M second nodes, and the procedure is re-executed from step 302.

Figure 4:
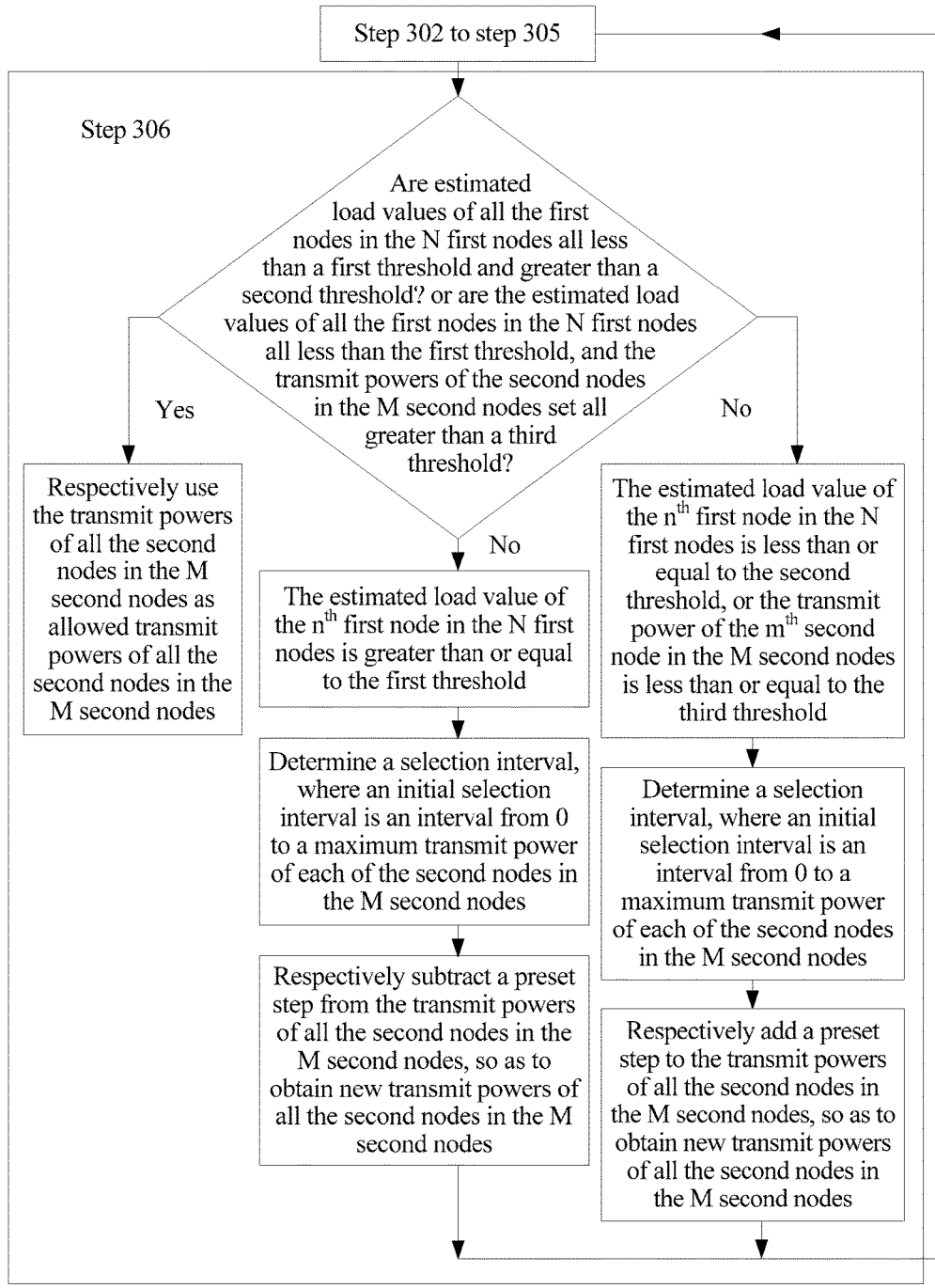
FIG. 4 is a schematic flowchart of a method for determining an allowed transmit power of each second node in M second nodes in a power estimation method according to another embodiment of the present invention.

Specifically, referring to a process of determining the allowed transmit power of each second node in the M second nodes shown in FIG. 4, the second implementation manner is described by using a dichotomy as an example.

With reference to step 302, optionally, the transmit power of the $m^{th}$ second node in the M second nodes is less than or equal to the maximum transmit power of an $m^{th}$ second node. Specifically and optionally, the network device obtains the maximum transmit power of each second node in the M second nodes from a network management device of the second node by sending a request to the network management device of the second node, and the maximum transmit power of the $m^{th}$ second node in the M second nodes is set as the transmit power of the $m^{th}$ second node in the M second nodes.

A case in which the maximum transmit power of each second node in the M second nodes is $P_1$ is used as an example herein. The process of determining the allowed transmit power of each second node in the M second nodes is described. With reference to step 302 to step 305, $\rho_{s,s}$ is obtained by means of calculation according to $P_1$.

Optionally, in a specific application scenario, when $\rho_{s,s}$ that is corresponding to $P_1$ is greater than the first threshold, a preset step-size is individually subtracted from the transmit power of each second node in the M second nodes, so as to obtain a new transmit power of each second node in the M second nodes. The preset step-size is half of a length of a selection interval, where the selection interval is a value range of a preset value set when the transmit power is set for each second node in the M second nodes. In this case, the selection interval is a first interval, where the first interval is specifically an interval greater than 0 and less than or equal to $P_1$; the preset step-size is specifically $(P_1-0)/2$; a preset step-size is subtracted from $P_1$, so as to obtain a new transmit power $P_2$ of each second node in the M second nodes, and the procedure is re-executed from step 302. With reference to step 302 to step 305, $\rho_{s,s}$ that is corresponding to $P_2$ is obtained by means of calculation according $P_2$. $P_2$ is a median of the first interval, and specifically, $P_2=(0+P_1)/2$.

Figure 5:
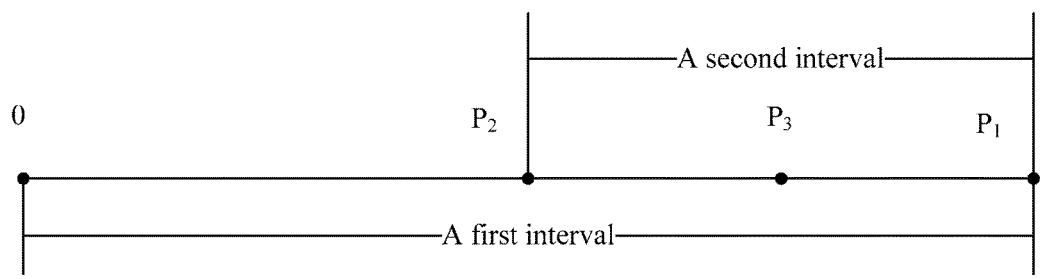
FIG. 5 is a schematic flowchart of a method for setting a transmit power for each second node in M second nodes in a power estimation method according to another embodiment of the present invention.

Optionally, when the transmit power set for each second node in the M second nodes is $P_2$, and if the transmit power of the $m^{th}$ second node in the M second nodes is less than or equal to the third threshold, it indicates that $P_2$ is relatively low. In this case, a second interval is used as the selection interval, and the second interval is an interval greater than $P_2$ and less then or equal to $P_1$. A preset step-size is individually added to the transmit power of each second node in the M second nodes, so as to obtain a new transmit power of each second node in the M second nodes. Optionally, the preset step-size is half of a length of a selection interval, that is, half of a length of the second interval. In this case, the preset step-size is specifically $(P_1-P_2)/2$; a preset step-size is added to $P_2$, so as to obtain a new transmit power $P_3$ of each second node in the M second nodes, and the procedure is re-executed from step 302. $P_3$ is a median of the second interval, and specifically, $P_3=(P_1+P_2)/2$. By means of such cyclic operations, the preset step-size is gradually reduced by repeatedly executing steps 302 to 306. Specifically and optionally, a difference between a maximum value of the selection interval and an allowed transmit power accuracy is used as the third threshold. Further, optionally, the allowed transmit power accuracy may be set to 5% of the maximum transmit power of the second node, that is, 5% of $P_1$. When the preset step-size is less than or equal to a preset length of the allowed transmit power accuracy, and the transmit power of each second node in the M second nodes is greater the third threshold, the transmit power of the $m^{th}$ second node in the M second nodes is used as an allowed transmit power of the node. A relationship between $P_1$, $P_2$, and $P_3$ on a value axis is shown as FIG. 5. An interval from 0 to $P_1$ is the first interval, and an interval from $P_2$ to $P_1$ is the second interval; $P_2$ is the median of the first interval, and $P_3$ is the median of the second interval.

In the process of determining the allowed transmit power of the $m^{th}$ second node in the M second nodes by using the dichotomy, a new transmit power is first set for each second node in the M second nodes, where the new transmit power is a median of a selection interval, and $\rho_{s,s}$ that is corresponding to the new transmit power is obtained by means of calculation according to the new transmit power. By cyclically executing steps 302 to 306, the selection interval is constantly narrowed, $\rho_{s,s}$ is increasingly approaching the first threshold, and the transmit power of each second node in the M second nodes is increasingly approaching the third threshold. Consequently, the estimated load value of each first node in the N first nodes is less than a first threshold, and transmit power of each second node in the M second nodes is greater than a third threshold. In this case, the transmit power of the $m^{th}$ second node in the M second nodes is used as an allowed transmit power of the second node.

If the allowed transmit power determined for the $m^{th}$ second node in the M second nodes is greater than the maximum transmit power of the $m^{th}$ second node, it indicates that the $m^{th}$ second node in the M second nodes may operate at the maximum transmit power.

In the process of determining the allowed transmit power of the $m^{th}$ second node in the M second nodes by using the dichotomy, the preset step-size is half of a length of the selection interval. A new transmit power of each second node in the M second nodes is obtained by individually adding or subtracting a preset step-size to or from the transmit power of each second node in the M second nodes. Optionally, the preset step-size may be set to a fixed value. Specifically and optionally, the preset step-size may be 1% of $P_1$, and a specific value of the preset step-size may be adjusted according to an actual situation. Only an exemplary description is provided herein, and the present invention imposes no limitation on the specific value of the preset step-size. In a case that the preset step-size is fixed, with reference to steps 302 to 306, a new transmit power of each second node in the M second nodes is obtained by adding or subtracting a preset step-size to or from the transmit power of each second node in the M second nodes, and the allowed transmit power of each second node in the M second nodes is finally determined.

With reference to the process of determining the allowed transmit power of the $m^{th}$ second node in the M second nodes, a description of setting the first threshold is performed herein. Optionally, the first threshold is a sum of a maximum value in first load values of the N first nodes and a first preset margin, or a product of a maximum value in the first load values of the N first nodes and a first preset coefficient. This embodiment provides the following three manners for setting the first threshold, which certainly does not represent that in this embodiment, the first threshold can be set only in the following three manners. Three specific implementation manners are merely listed herein, and the present invention imposes no limitation on a specific manner of setting the first threshold.

A first setting manner is that a first load value of the $n^{th}$ first node in the N first nodes is a maximum value in actual load values of the $n^{th}$ first node in the N first nodes. The actual load value of the $n^{th}$ first node is used to indicate an actual physical resource consumption level of the $n^{th}$ first node. Specifically, statistics collection is performed on actual load values of each first node in the N first nodes, and it is determined that the maximum value in the actual load values of the $n^{th}$ first node in the N first nodes is $\rho_n$, where $0 \leq n \leq N$. Maximum values in the actual load values of each first node in the N first nodes are respectively $\rho_1$, $\rho_2$, $\rho_3$, ... $\rho_n$ ..., among which a maximum value is $\rho_{max}$, and a sum of $\rho_{max}$ and the first preset margin is used as the first threshold.

A second setting manner is that a first load value of the $n^{th}$ first node in the N first nodes is an arithmetic average value of actual load values of the $n^{th}$ first node in the N first nodes. Specifically, statistics collection is performed on actual load values of each first node in the N first nodes, and it is determined that an arithmetic average value of the actual load values of the $a^{th}$ first node in the N first nodes is $\rho_a$, where $0 \leq a \leq N$. Maximum values in the actual load values of each first node in the N first nodes that are obtained by means of statistics collection are respectively determined as: $\rho_1, \rho_2, \rho_3, \ldots \rho_a \ldots$, among which a maximum value is $\rho_{avr}$, and a product of $\rho_{avr}$ and the first preset coefficient is used as the first threshold.

Alternatively, a first load value of the nth first node in the N first nodes is obtained by performing weighted-sum of a maximum value in actual load values of the nth first node in the N first nodes and a predicted load value of the nth first node in the N first nodes. That is, the first threshold is a sum of $\rho_n \times \omega_1$ and $\rho_f \times \omega_2$, where $\rho_n$ is the maximum value in the actual load values of the nth first node in the N first nodes; $\rho_f$ is the predicted load value of the nth first node in the N first nodes; $\omega_1$ is a first weighting coefficient; and $\omega_2$ is a second weighting coefficient. The predicted load value of the nth first node in the N first nodes is a value obtained by predicting the actual load value of the nth first node. Specifically, statistics collection is performed on actual load values of each first node in the N first nodes; the maximum value $\rho_n$ in the actual load values of the nth first node in the N first nodes is determined; and the actual load value is predicted according to the statistics collection, so as to obtain the predicted load value $\rho_f$ of the nth first node in the N first nodes. Weighted-sum of $\rho_n$ and $\rho_f$ is performed so as to obtain $\rho_{fn}$, that is, $\rho_{fn} = \rho_n \times \omega_1 + \rho_f \times \omega_2$, where $0 \leq n \leq N$ and $0 \leq f \leq N$. Each first node in the N first nodes individually obtains: $\rho_{f1}, \rho_{f2}, \rho_{f3}, \ldots \rho_{fn} \ldots$, among which a maximum value is $\rho_{fore}$, and a sum of $\rho_{fore}$ and the first preset margin is used as the first threshold. Optionally, in a specific application scenario, $\omega_1$ is 70%, and $\omega_2$ is 30%.

307. Send allowed transmit power information of an $m^{th}$ second node in the M second nodes to the $m^{th}$ second node, where the allowed transmit power information is used to indicate an allowed transmit power of the $m^{th}$ second node.

Optionally, the mth second node in the M second nodes is an access point in the private wireless network, the network device may send the allowed transmit power of the mth second node to the mth second node by using the operation, administration and maintenance (OAM) center of the private wireless network.

Optionally, the network device may update the allowed transmit power of each second node in the M second nodes according to an actual situation, so that each second node in the M second nodes adjust the transmit power according to the actual situation. For example, the network device periodically determines the allowed transmit power for each second node in the M second nodes; or when the communication quality of the second node is poor, the network device is requested to re-determine the allowed transmit power for each second node in the M second nodes; or when a quantity, a location, or a working state of the second node is changed, the network device may determine the allowed transmit power for each second node in the M second nodes.

In the power estimation method provided in this embodiment of the present invention, a network device determines a transmit power of each second node in M second nodes according to an estimated load value of each first node in N first nodes. A specific solution is: obtaining an estimated load value of each first node in the N first nodes according to the transmit power and user service requirements of each first node in the N first nodes and the transmit power of each second node in the M second nodes; determining an allowed transmit power of each second node in the M second nodes; and sending the allowed transmit power of an mth second node in the M second nodes to the mth second node, so that the mth second node controls a transmit power according to the allowed transmit power of the mth second node. Compared with a method in the prior art in which a transmit power of the second node is determined for one second node, in this embodiment of the present invention, an estimated load value of each first node in the N first nodes, interference caused by the M second nodes to the N first nodes is considered as a whole according to the estimated load value of each first node in the N first nodes, so that transmit powers that are more appropriate are respectively determined for the M second nodes; that is, on a premise of controlling the interference caused by the M second nodes to the N first nodes to be within a range, the transmit powers of the M second nodes are increased so as to improve communication quality of the M second nodes. In addition, when load estimation is performed on the N first nodes, a case in which the M second nodes are fully loaded is considered as a whole. Therefore, that the transmit powers of the M second nodes are dynamically set to improve the communication quality of the M second nodes is not limited by a change to user distribution of the M second nodes.

Figure 6:
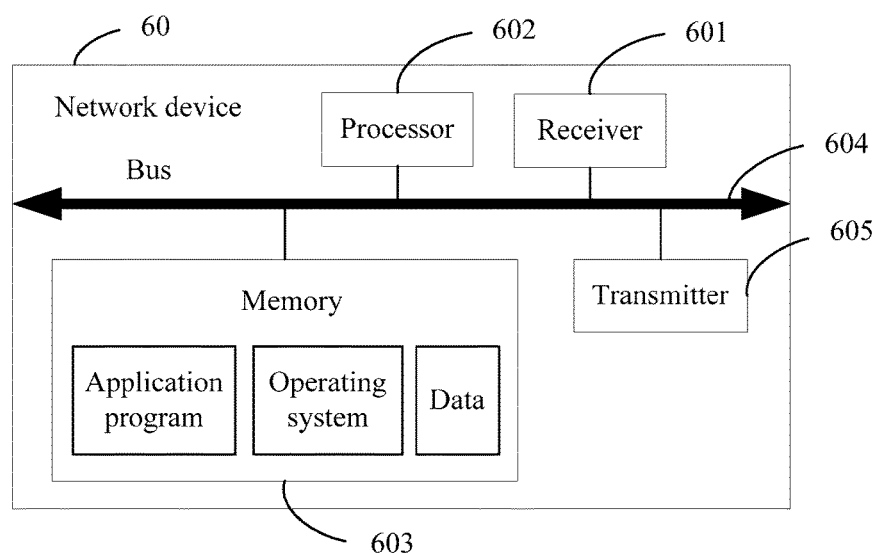
FIG. 6 is a schematic structural diagram of a network device according to an embodiment of the present invention.

An embodiment of the present invention provides a network device 60, configured to perform methods described in the embodiments corresponding to FIG. 1 and FIG. 3. Referring to FIG. 6, the network device 60 includes a receiver 601, a processor 602, a memory 603, and a bus 604. The receiver 601, the processor 602, and the memory 603 are connected to each other by using the bus 604.

The receiver 601 is configured to obtain a transmit power of each first node in N first nodes.

The processor 602 is configured to set a transmit power of each second node in M second nodes, where the second node is a network node that causes interference to at least one first node in the N first nodes.

The processor 602 is further configured to obtain user service requirements of each first node in the N first nodes, where user service requirements of an nth first node in the N first nodes are service data rates between the nth first node and users served by the nth first node, and n is a positive integer less than or equal to N.

The processor 602 is further configured to obtain an estimated load value of each first node in the N first nodes according to the transmit power of each first node in the N first nodes, the user service requirements of each first node in the N first nodes, and the transmit power of each second node in the M second nodes, where the estimated load value is a value obtained by estimating a physical resource consumption level of the nth first node in the N first nodes.

The processor 602 is further configured to: when the estimated load value of each first node in the N first nodes is less than a first threshold and greater than a second threshold, or when the estimated load value of each first node in the N first nodes is less than the first threshold and the transmit power of each second node in the M second nodes is greater than a third threshold, individually use the transmit power of each second node in the M second nodes as an allowed transmit power of each second node in the M second nodes.

Optionally, the processor 602 is further configured to: when the estimated load value of the nth first node in the N first nodes is greater than or equal to the first threshold, individually subtract a preset step-size from the transmit power of each second node in the M second nodes, so as to obtain a new transmit power of each second node in the M second nodes.

Optionally, the processor 602 is further configured to: when the estimated load value of the nth first node in the N first nodes is less than or equal to the second threshold, or when a transmit power of an mth second node in the M second nodes is less than or equal to the third threshold, individually add a preset step-size to the transmit power of each second node in the M second nodes, so as to obtain a new transmit power of each second node in the M second nodes.

Optionally, the processor 602 is further configured to obtain channel gains from each first node and each second node to each user.

The processor 602 is further configured to obtain, by means of calculation according to a first formula, the estimated load value of the nth first node in the N first nodes, where the first formula is:

$$\rho_{i \in M_O} = \min \left\{ \frac{\sum_{j \in I} d_j x_{i,j}}{KB \log_2 \left( 1 + \frac{P_i g_{i,j}}{\sum_{l \in M_O \setminus \{i\}} P_l g_{l,j} \rho_l + \sum_{q \in M_T} P_q g_{q,j} + \sigma^2} \right)}, 1 \right\}$$

where i represents an $i^{th}$ first node; l represents an $l^{th}$ first node; q represents a $q^{th}$ second node; $\rho_i$ and $\rho_l$ are respectively estimated load values of the $i^{th}$ first node and the $l^{th}$ first node; I is a set formed by users served by the N first nodes; j represents a user j; $d_j$ is a user service requirement of the user j; $x_{i,j}$ is equal to 1 or 0, where that $x_{i,j}$ is equal to 1 indicates that the $i^{th}$ first node provides a service for the user j, and that $x_{i,j}$ is equal to 0 indicates that the $i^{th}$ first node does not provide a service for the user j;

$$\sum_{j \in I} d_j x_{i,j}$$

is a user service requirement of the $i^{th}$ first node; K is a quantity of system resource blocks; B is a modulation factor; $M_O$ is a set of the N first nodes; $M_T$ is a set of the M second nodes; $P_i$ and $P_l$ are respectively a transmit power of the $i^{th}$ first node and a transmit power of the $l^{th}$ first node; $P_q$ is a transmit power of the $q^{th}$ second node; $g_{i,j}$, $g_{l,j}$, and $g_{q,j}$ are respectively a channel gain from the $i^{th}$ first node to the user j, a channel gain from the $l^{th}$ first node to the user j, and a channel gain from the $q^{th}$ second node to the user j; and $\sigma^2$ is a noise power.

Optionally, the processor 602 is further configured to use a sum of a maximum value in first load values of the N first nodes and a first preset margin, or a product of a maximum value in the first load values of the N first nodes and a first preset coefficient as the first threshold.

A first load value of the nth first node in the N first nodes is a maximum value in actual load values of the nth first node in the N first nodes, where the actual load value of the nth first node is used to indicate an actual physical resource consumption level of the nth first node.

Alternatively, a first load value of the nth first node in the N first nodes is an arithmetic average value of actual load values of the nth first node in the N first nodes.

Alternatively, a first load value of the nth first node in the N first nodes is a sum of $\rho_n \times \omega_1$ and $\rho_f \times \omega_2$, where $\rho_n$ is a maximum value in actual load values of the nth first node in the N first nodes, and $\rho_f$ is a predicted load value of the nth first node in the N first nodes; the predicted load value of the nth first node in the N first nodes is a value obtained by predicting an actual load value of the nth first node; $\omega_1$ is a first weighting coefficient, and $\omega_2$ is a second weighting coefficient.

Optionally, the network device 60 further includes a transmitter 605, configured to send allowed transmit power information of the mth second node in the M second nodes to the mth second node, where the allowed transmit power information is used to indicate an allowed transmit power of the mth second node.

The network device provided in this embodiment of the present invention determines a transmit power of each second node in M second nodes according to an estimated load value of each first node in N first nodes. Compared with a method in the prior art in which a transmit power of the second node is determined for one second node, in this embodiment of the present invention, interference caused by the M second nodes to the N first nodes is considered as a whole according to the estimated load value of each first node in the N first nodes, so that transmit powers that are more appropriate are respectively determined for the M second nodes; that is, on a premise of controlling the interference caused by the M second nodes to the N first nodes to be within a range, the transmit powers of the M second nodes are increased so as to improve communication quality of the M second nodes. In addition, when load estimation is performed on the N first nodes, a case in which the M second nodes are fully loaded is considered as a whole. Therefore, that the transmit powers of the M second nodes are dynamically set to improve the communication quality of the M second nodes is not limited by a change to user distribution of the M second nodes.

Figure 7:
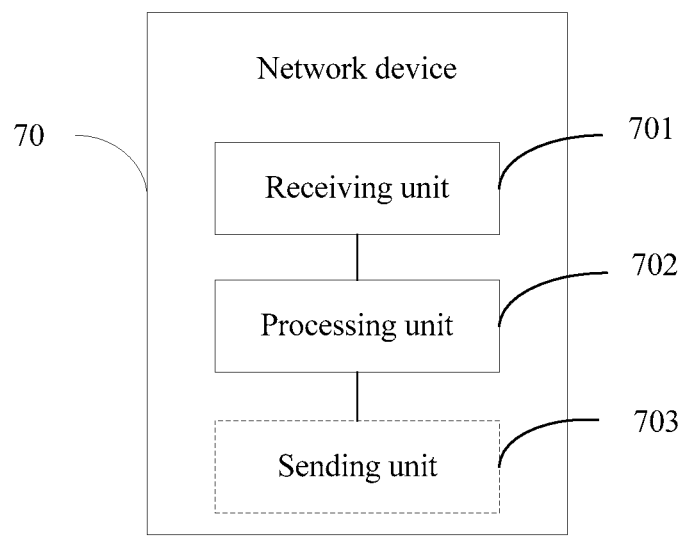
FIG. 7 is a schematic structural diagram of another network device according to an embodiment of the present invention.

An embodiment of the present invention provides another network device 70, configured to perform methods described in the embodiments corresponding to FIG. 1 and FIG. 2. Referring to FIG. 7, the network device 70 includes a receiving unit 701 and a processing unit 702.

The receiving unit 701 is configured to obtain a transmit power of each first node in N first nodes.

The processing unit 702 is configured to set a transmit power of each second node in M second nodes, where the second node is a network node that causes interference to at least one first node in the N first nodes.

The processing unit 702 is further configured to obtain user service requirements of each first node in the N first nodes, where user service requirements of an nth first node in the N first nodes are service data rates between the nth first node and users served by the nth first node, and n is a positive integer less than or equal to N.

The processing unit 702 is further configured to obtain an estimated load value of each first node in the N first nodes according to the transmit power of each first node in the N first nodes, the user service requirements of each first node in the N first nodes, and the transmit power of each second node in the M second nodes, where the estimated load value is a value obtained by estimating a physical resource consumption level of the nth first node in the N first nodes.

The processing unit 702 is further configured to: when the estimated load value of each first node in the N first nodes is less than a first threshold and greater than a second threshold, or when the estimated load value of each first node in the N first nodes is less than the first threshold and the transmit power of each second node in the M second nodes is greater than a third threshold, individually use the transmit power of each second node in the M second nodes as an allowed transmit power of each second node in the M second nodes.

Optionally, the processing unit 702 is further configured to: when the estimated load value of the nth first node in the N first nodes is greater than or equal to the first threshold, individually subtract a preset step-size from the transmit power of each second node in the M second nodes, so as to obtain a new transmit power of each second node in the M second nodes.

Optionally, the processing unit 702 is further configured to: when the estimated load value of the nth first node in the N first nodes is less than or equal to the second threshold, or when a transmit power of an mth second node in the M second nodes is less than or equal to the third threshold, individually add a preset step-size to the transmit power of each second node in the M second nodes, so as to obtain a new transmit power of each second node in the M second nodes.

Optionally, the processing unit 702 is further configured to obtain channel gains from each first node and each second node to each user.

The processing unit 702 is further configured to obtain, by means of calculation according to a first formula, the estimated load value of the nth first node in the N first nodes, where the first formula is:

$$\rho_{i \in M_O} = \min\left\{ \frac{\sum_{j \in I} d_j x_{i,j}}{KB\log_2\left(1 + \frac{P_i g_{i,j}}{\sum_{l \in M_O \setminus \{i\}} P_l g_{l,j} \rho_l + \sum_{q \in M_T} P_q g_{q,j} + \sigma^2}\right)}, 1 \right\}$$

where i represents an $i^{th}$ first node; l represents an $l^{th}$ first node; q represents a $q^{th}$ second node; $\rho_i$ and $\rho_l$ are respectively estimated load values of the $i^{th}$ first node and the $l^{th}$ first node; I is a set formed by users served by the N first nodes; j represents a user j; $d_j$ is a user service requirement of the user j; $x_{i,j}$ is equal to 1 or 0, where that $x_{i,j}$ is equal to 1 indicates that the $i^{th}$ first node provides a service for the user j, and that $x_{i,j}$ is equal to 0 indicates that the $i^{th}$ first node does not provide a service for the user j;

$$\sum_{j \in I} d_j x_{i,j}$$

is a user service requirement of the $i^{th}$ first node; K is a quantity of system resource blocks; B is a modulation factor; $M_O$ is a set of the N first nodes; $M_T$ is a set of the M second nodes; $P_i$ and $P_l$ are respectively a transmit power of the $i^{th}$ first node and a transmit power of the $l^{th}$ first node; $P_q$ is a transmit power of the $q^{th}$ second node; $g_{i,j}$, $g_{l,j}$, and $g_{q,j}$ are respectively a channel gain from the $i^{th}$ first node to the user j, a channel gain from the $l^{th}$ first node to the user j, and a channel gain from the $q^{th}$ second node to the user j; and $\sigma^2$ is a noise power.

Optionally, the processing unit 702 is further configured to use a sum of a maximum value in first load values of the N first nodes and a first preset margin, or a product of a maximum value in the first load values of the N first nodes and a first preset coefficient as the first threshold.

A first load value of the nth first node in the N first nodes is a maximum value in actual load values of the nth first node in the N first nodes, where the actual load value of the nth first node is used to indicate an actual physical resource consumption level of the nth first node.

Alternatively, a first load value of the nth first node in the N first nodes is an arithmetic average value of actual load values of the nth first node in the N first nodes.

Alternatively, a first load value of the nth first node in the N first nodes is a sum of $\rho_n \times \omega_1$ and $\rho_f \times \omega_2$, where $\rho_n$ is a maximum value in actual load values of the nth first node in the N first nodes, and $\rho_f$ is a predicted load value of the nth first node in the N first nodes; the predicted load value of the nth first node in the N first nodes is a value obtained by predicting an actual load value of the nth first node; $\omega_1$ is a first weighting coefficient, and $\omega_2$ is a second weighting coefficient.

Optionally, the network device 70 further includes a sending unit 703, configured to send allowed transmit power information of the mth second node in the M second nodes to the mth second node, where the allowed transmit power information is used to indicate an allowed transmit power of the mth second node.

The network device provided in this embodiment of the present invention determines a transmit power of each second node in M second nodes according to an estimated load value of each first node in N first nodes. Compared with a method in the prior art in which a transmit power of the second node is determined for one second node, in this embodiment of the present invention, interference caused by the M second nodes to the N first nodes is considered as a whole according to the estimated load value of each first node in the N first nodes, so that transmit powers that are more appropriate are respectively determined for the M second nodes; that is, on a premise of controlling the interference caused by the M second nodes to the N first nodes to be within a range, the transmit powers of the M second nodes are increased so as to improve communication quality of the M second nodes. In addition, when load estimation is performed on the N first nodes, a case in which the M second nodes are fully loaded is considered as a whole. Therefore, that the transmit powers of the M second nodes are dynamically set to improve the communication quality of the M second nodes is not limited by a change to user distribution of the M second nodes.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a Random Access Memory (RAM), a Read-Only Memory (ROM), an Electrically Erasable Programmable Read-Only Memory (EEPROM), a Compact Disc Read-Only Memory (CD-ROM) or other optical disc storage, a disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a Digital Subscriber Line (DSL) or wireless technologies such as infrared ray, radio and microwave, the coaxial cable, optical fiber/cable, twisted pair, DSL or wireless technologies such as infrared ray, radio and microwave are included in the definition of a medium to which they belong. For example, a disk and disc used by the present invention includes a Compact Disc (CD), a laser disc, an optical disc, a Digital Versatile Disc (DVD), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power estimation method, comprising:
    obtaining a transmit power of each first node in N first nodes;
    setting a transmit power of each second node in M second nodes, wherein each second node is a network node that causes interference to at least one first node in the N first nodes;
    obtaining channel gains from each first node and each second node to each user;
    obtaining user service requirements of each first node in the N first nodes, wherein user service requirements of an $n^{th}$ first node in the N first nodes are service data rates between the $n^{th}$ first node and users served by the $n^{th}$ first node, and n is a positive integer less than or equal to N;
    obtaining an estimated load value of each first node in the N first nodes according to the transmit power of each first node in the N first nodes, the user service requirements of each first node in the N first nodes, and the transmit power of each second node in the M second nodes, wherein the estimated load value of the $n^{th}$ first node in the N first nodes is a value obtained by estimating a physical resource consumption level of the $n^{th}$ first node in the N first nodes; and
    when the estimated load value of each first node in the N first nodes is less than a first threshold and greater than a second threshold, or the estimated load value of each first node in the N first nodes is less than the first threshold and the transmit power of each second node in the M second nodes is greater than a third threshold, individually using the transmit power of each second node in the M second nodes as an allowed transmit power of each second node in the M second nodes,
    wherein the obtaining estimated load value of each first node in the N first nodes according to the transmit power of each first node in the N first nodes, the user service requirements of each first node in the N first nodes, and the transmit power of each second node in the M second nodes comprises:
        substituting the transmit power of each first node in the N first nodes, the user service requirements of each first node in the N first nodes, and the transmit power of each second node in the M second nodes into a first formula, so as to obtain, by means of calculation, the estimated load value of the $n^{th}$ first node in the N first nodes,
    wherein the first formula is:

$$\rho_{i \in M_O} = \min\left\{ \frac{\sum_{j \in I} d_j x_{i,j}}{KB\log_2\left(1 + \frac{P_i g_{i,j}}{\sum_{l \in M_O \setminus \{i\}} P_l g_{l,j} \rho_l + \sum_{q \in M_T} P_q g_{q,j} + \sigma^2}\right)}, 1 \right\}$$

wherein i represents an $i^{th}$ first node; l represents an $l^{th}$ first node; q represents a $q^{th}$ second node; $\rho_i$ and $\rho_l$ are respectively estimated load values of the $i^{th}$ first node and the $l^{th}$ first node; I is a set formed by users served by the N first nodes; j represents a user j; $d_j$ is a user service requirement of the user j; $x_{i,j}$ is equal to 1 or 0,
    wherein that $x_{i,j}$ is equal to 1 indicates that the $i^{th}$ first node provides a service for the user j, and that $x_{i,j}$ is equal to 0 indicates that the $i^{th}$ first node does not provide a service for the user j;
    where $$\sum_{j \in I} d_j x_{i,j}$$

is a user service requirement of the $i^{th}$ first node;
    where K is a quantity of system resource blocks; and B is a modulation factor;
    where $M_o$ is a set of the N first nodes; $M_T$ is a set of the M second nodes;
    where $P_i$ and $P_l$ are respectively a transmit power of the $i^{th}$ first node and a transmit power of the $l^{th}$ first node; $P_q$ is a transmit power of the $q^{th}$ second node;
    where $g_{i,j}$, $g_{l,j}$, and $g_{q,j}$ are respectively a channel gain from the $i^{th}$ first node to the user j, a channel gain from the $l^{th}$ first node to the user j, and a channel gain from the $q^{th}$ second node to the user j; and
    where $\sigma^2$ is a noise power.

2. The method according to claim 1, wherein the method further comprises:
    when the estimated load value of the $n^{th}$ first node in the N first nodes is greater than or equal to the first threshold, individually subtracting a preset step-size from the transmit power of each second node in the M second nodes, so as to obtain a new transmit power of each second node in the M second nodes.

3. The method according to claim 1, wherein the method further comprises:
    when the estimated load value of the $n^{th}$ first node in the N first nodes is less than or equal to the second threshold, or a transmit power of an $m^{th}$ second node in the M second nodes is less than or equal to the third threshold, individually adding a preset step-size to the transmit power of each second node in the M second nodes, so as to obtain a new transmit power of each second node in the M second nodes.

4. The method according to claim 1, wherein:
    the first threshold is a sum of a maximum value in first load values of the N first nodes and a first preset margin, or a product of a maximum value in the first load values of the N first nodes and a first preset coefficient; and a first load value of the $n^{th}$ first node in the N first nodes is a maximum value in actual load values of the $n^{th}$ first node in the N first nodes, wherein the actual load value of the $n^{th}$ first node is used to indicate an actual physical resource consumption level of the $n^{th}$ first node; or a first load value of the $n^{th}$ first node in the N first nodes is an arithmetic average value of actual load values of the $n^{th}$ first node in the N first nodes; or a first load value of the $n^{th}$ first node in the N first nodes is a sum of $\rho_n \times \omega_1$ and $\rho_f \times \omega_2$, wherein $\rho_n$ is a maximum value in actual load values of the $n^{th}$ first node in the N first nodes, and $\rho_f$ is a predicted load value of the $n^{th}$ first node in the N first nodes, wherein the predicted load value of the $n^{th}$ first node in the N first nodes is a value obtained by predicting an actual load value of the $n^{th}$ first node, $\omega_1$ is a first weighting coefficient, and $\omega_2$ is a second weighting coefficient.

5. The method according to claim 1, wherein the method further comprises:

sending allowed transmit power information of the $m^{th}$ second node in the M second nodes to the $m^{th}$ second node, wherein the allowed transmit power information is used to indicate the allowed transmit power of the $m^{th}$ second node.

6. A network device, wherein the network device comprises: a receiver, a processor, a memory, and a bus, and the receiver, the processor, and the memory are connected to each other by using the bus, wherein the receiver is configured to obtain a transmit power of each first node in N first nodes;

wherein the processor is configured to set a transmit power of each second node in M second nodes, wherein keach second node is a network node that causes interference to at least one first node in the N first nodes;

wherein the processor is further configured to obtain user service requirements of each first node in the N first nodes, wherein user service requirements of an $n^{th}$ first node in the N first nodes are service data rates between the $n^{th}$ first node and users served by the $n^{th}$ first node, and n is a positive integer less than or equal to N;

wherein the processor is further configured to obtain channel gains from each first node and each second node to each user;

wherein the processor is further configured to obtain an estimated load value of each first node in the N first nodes according to: the transmit power of each first node in the N first nodes, the user service requirements of each first node in the N first nodes, and the transmit power of each second node in the M second nodes, wherein the estimated load value is a value obtained by estimating a physical resource consumption level of the $n^{th}$ first node in the N first nodes by means of calculation according to a first formula, the estimated load value of the $n^{th}$ first node in the N first nodes, wherein the first formula is:

$$\rho_{i \in M_O} = \min \left\{ \frac{\sum_{j \in I} d_j x_{i,j}}{KB \log_2 \left(1 + \frac{P_i g_{i,j}}{\sum_{l \in M_O \setminus \{i\}} P_l g_{l,j} \rho_l + \sum_{q \in M_T} P_q g_{q,j} + \sigma^2}\right)}, 1 \right\}$$

wherein i represents an $i^{th}$ first node; l represents an $l^{th}$ first node; q represents a $q^{th}$ second node; $\rho_i$ and $\rho_l$ are respectively estimated load values of the $i^{th}$ first node and the $l^{th}$ first node; I is a set formed by users served by the N first nodes; j represents a user j, $d_j$ is a user service requirement of the user j; $x_{i,j}$ is equal to 1 or 0, wherein that $x_{i,j}$ is equal to 1 indicates that the $i^{th}$ first node provides a service for the user j, and that $x_{i,j}$ is equal to 0 indicates that the $i^{th}$ first node does not provide a service for the user j;

where $$\sum_{j \in I} d_j x_{i,j}$$

is a user service requirement of the $i^{th}$ first node;

where K is a quantity of system resource blocks; and B is a modulation factor;

where $M_O$ is a set of the N first nodes; $M_T$ is a set of the M second nodes;

where $P_i$ and $P_l$ are respectively a transmit power of the $i^{th}$ first node and a transmit power of the $l^{th}$ first node; $P_q$ is a transmit power of the $q^{th}$ second node;

where $g_{i,j}$, $g_{l,j}$, and $g_{q,j}$ are respectively a channel gain from the $i^{th}$ first node to the user j, a channel gain from the $l^{th}$ first node to the user j, and a channel gain from the $q^{th}$ second node to the user j; and where $\sigma^2$ is a noise power;

wherein the processor is further configured to: when the estimated load value of each first node in the N first nodes is less than a first threshold and greater than a second threshold, or when the estimated load value of each first node in the N first nodes is less than the first threshold and the transmit power of each second node in the M second nodes is greater than a third threshold, individually use the transmit power of each second node in the M second nodes as an allowed transmit power of each second node in the M second nodes.

7. The network device according to claim 6, wherein:

the processor is further configured to: when the estimated load value of the $n^{th}$ first node in the N first nodes is greater than or equal to the first threshold, individually subtract a preset step-size from the transmit power of each second node in the M second nodes, so as to obtain a new transmit power of each second node in the M second nodes.

8. The network device according to claim 6, wherein:

the processor is further configured to: when the estimated load value of the $n^{th}$ first node in the N first nodes is less than or equal to the second threshold, or when a transmit power of an $m^{th}$ second node in the M second nodes is less than or equal to the third threshold, individually add a preset step-size to the transmit power of each second node in the M second nodes, so as to obtain a new transmit power of each second node in the M second nodes.

9. The network device according to claim 6, wherein:

the processor is further configured to use a sum of a maximum value in first load values of the N first nodes and a first preset margin, or a product of a maximum value in the first load values of the N first nodes and a first preset coefficient as the first threshold, wherein a first load value of the $n^{th}$ first node in the N first nodes is a maximum value in actual load values of the $n^{th}$ first node in the N first nodes, wherein the actual load value of the $n^{th}$ first node is used to indicate an actual physical resource consumption level of the $n^{th}$ first node; or a first load value of the $n^{th}$ first node in the N first nodes is an arithmetic average value of actual load values of the $n^{th}$ first node in the N first nodes; or a first load value of the $n^{th}$ first node in the N first nodes is a sum of $\rho_n \times \omega_1$ and $\rho_f \times \omega_2$, wherein $\rho_n$ is a maximum value in actual load values of the $n^{th}$ first node in the N first nodes, and $\rho_f$ is a predicted load value of the $n^{th}$ first node in the N first nodes, wherein the predicted load value of the $n^{th}$ first node in the N first nodes is a value obtained by predicting an actual load value of the $n^{th}$ first node, $\omega_1$ is a first weighting coefficient, and $\omega_2$ is a second weighting coefficient.

10. The network device according to claim 6, wherein:

the network device further comprises a transmitter, configured to send allowed transmit power information of the $m^{th}$ second node in the M second nodes to the $m^{th}$ second node, wherein the allowed transmit power information is used to indicate the allowed transmit power of the $m^{th}$ second node.

* * * * *